(12) United States Patent
Nakamura (10) Patent No.: US 6,735,384 B2
(45) Date of Patent: May 11, 2004

(54) IMAGE TAKING APPARATUS HAVING A DISTANCE MEASURING DEVICE

(75) Inventor: Kenji Nakamura, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/348,334

(22) Filed: Jan. 22, 2003

(65) Prior Publication Data

US 2003/0138246 A1 Jul. 24, 2003

(30) Foreign Application Priority Data

Jan. 22, 2002 (JP) .................................. 2002-012701

(51) Int. Cl.[7] .............................................. G03B 13/36
(52) U.S. Cl. ............................ 396/80; 396/92; 396/96
(58) Field of Search ............................... 396/92, 96, 80

(56) References Cited

U.S. PATENT DOCUMENTS 4,791,446 A * 12/1988 Ishida et al. .................. 396/96
5,051,767 A   9/1991  Honma et al. ................. 396/80
5,483,318 A   1/1996  Hamada et al. ............... 396/121

* cited by examiner

*Primary Examiner*—W. B. Perkey
(74) *Attorney, Agent, or Firm*—McDermott, Will & Emery (57) ABSTRACT

A distance measuring device provided in a camera has: a pair of integration-type image sensor arrays; a plurality of brightness monitors being placed close to one of the image sensor arrays, each independently for measuring the brightness of the subject in a predetermined area and for outputting a signal corresponding to the brightness; a selector for selecting one of the brightness signals from the brightness monitors based on the taking condition; and a controller for controlling the termination of integration by the image sensor arrays based on the selected brightness signal. At least one of the brightness monitors has a measurement width area being large in the direction of the base line of the image sensor arrays compared to a second brightness monitor, and covers the measurement area of the second brightness monitor.

12 Claims, 7 Drawing Sheets

IMAGE TAKING APPARATUS HAVING A DISTANCE MEASURING DEVICE

This application is based on the application No. 2002-12701 filed in Japan, the contents of which are hereby incorporated by reference.

BACKGROUND OF THE INVENTION

1. Field of the Invention

The present invention relates to an image taking apparatus such as a compact camera, a movie camera, a digital camera and a surveillance camera having a distance measuring device according to an external light passive auto focus (AF) method.

2. Description of the Related Art

In the subject brightness, there is a light quantity difference of approximately one hundred thousand times between sunlight in the daytime and moonlight in the nighttime. In order that appropriate distance measurement and exposure can be obtained even under taking conditions where there is such a light quantity difference, conventionally, a distance measuring device is used that is provided with a brightness monitor and uses image sensors which are an application of photoelectric conversion.

In this distance measuring device, an image sensor for the brightness monitor placed close to an image sensor for distance measurement is provided, and in accordance with the output from the image sensor for the brightness monitor, the accumulation time (integration time) of charges generated by the image sensor for distance measurement is controlled.

However, since the subject brightness distribution is not uniform over the entire area of the image sensor and dark parts and bright parts are intermingled with each other, when a brightness monitor monitoring the entire area of the image sensor for distance measurement is used, bright parts and darks parts exceed the dynamic range of the image sensor, so that it is impossible to perform control for sufficiently obtaining the contrast of the subject.

Figure 12:
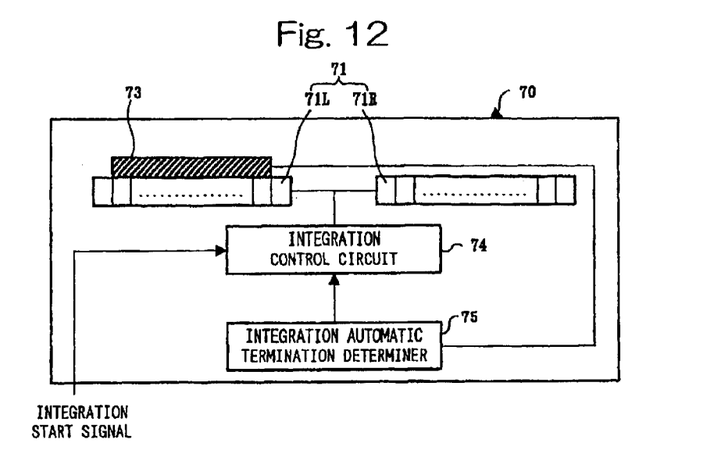
FIG. 12 is a block diagram showing the structure of the conventional distance measuring device.

That is, conventional distance measuring devices are typically provided with a brightness monitor 73 detecting the brightness of the subject and being placed close to, of a pair of left and right distance measurement image sensor arrays 71 (71L, 71R), the integration-type image sensor array 71L as shown in FIG. 12. An integration control circuit 74 outputs a signal to start accumulation of the charges generated by the integration-type image sensor arrays 71 when receiving an integration start signal, and terminates the accumulation of the charges generated by the image sensor arrays 71 when receiving from an integration automatic termination determiner 75 a signal representative of automatic termination of the integration determined in accordance with the typical brightness of the subject. That is, the brightness monitor 73 transmits a signal representative of the typical brightness of the subject to the integration automatic termination determiner 75, and the integration control circuit 74 controls the image sensor arrays 71 so as to determine the charge accumulation time based on the value of the brightness.

Figure 13:
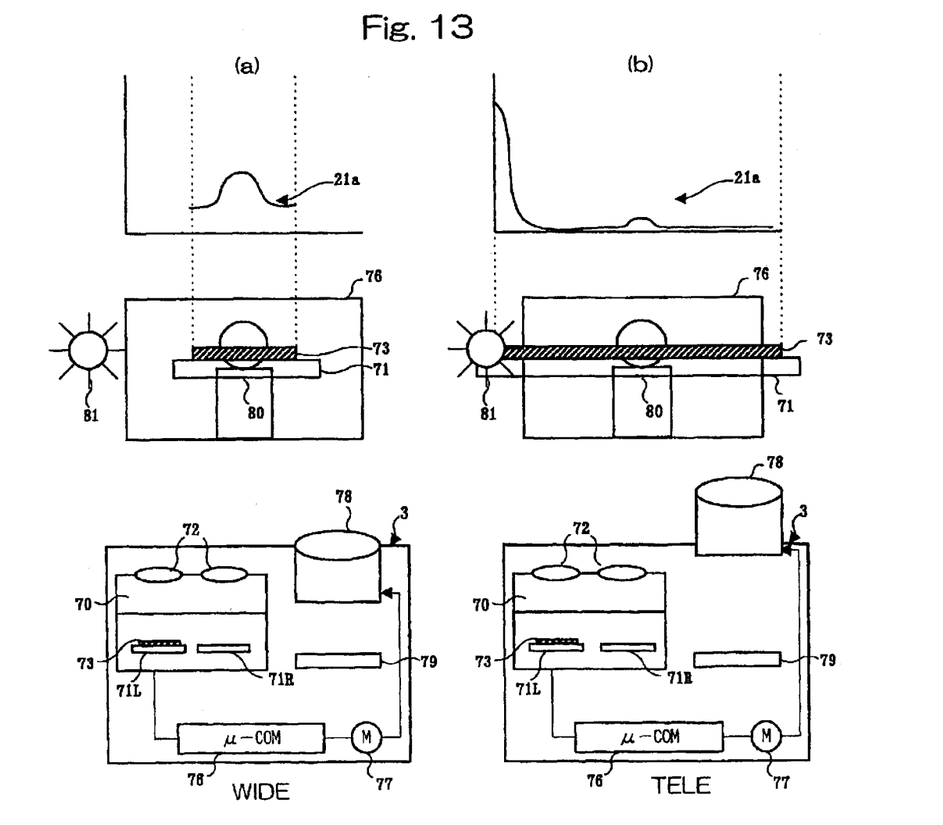
FIGS. 13(a) and 13(b) are views of assistance in explaining the position of the brightness monitor when image taking is performed by use of the distance measuring device of FIG. 12, FIG. 13(a) showing the case where the focal length is short, FIG. 13(b) showing the case where the focal length is long.

However, since the optical system of the conventional distance measuring device is not interlocked with the taking optical system of the camera, when the taking area is changed by a change in the focal length of the taking optical system or the like, the measurement area of the brightness monitor is not interlocked with the change. That is, under the control of a microcomputer 76, the focal length of the taking optical system 78 is changed by the zoom lens system being moved by a motor 77, so that the taking area is changed. On the other hand, the optical system 72 of the distance measuring device has no mechanism to change its focal length in response to a movement of the taking optical system. Therefore, when the focal length of the taking optical system is short and the image plane (taking area) of the taking optical system is large, the image sensor arrays 71 or the brightness monitor 73 is included in the taking area as shown in FIG. 13(a). In this case, even when a high-brightness light source 81 such as the sun is present in the background of a main subject 80, in an output signal 21a from the brightness monitor 73, the brightness of the part of the subject 80 is high.

When the taking area of the taking optical system is decreased for a reason such that the focal length of the taking optical system 78 is increased, there are cases where parts of the image sensor arrays 71 or the brightness monitor 73 of the distance measuring device extend off the image plane of the taking optical system as shown in FIG. 13(b). In such cases, the brightness monitor 73 is situated so as to overlap with the high-brightness light source 81 present in the background of the main subject 80. Therefore, in these cases, in an output signal 21b from the brightness monitor 73, the brightness of the high-brightness subject 81 is high, and the charge accumulation time of the image sensor arrays 71 is determined by using as the reference (typical brightness) the brightness of the light source 81 not included in the image plane of the taking optical system. Consequently, a typical brightness insufficient for obtaining an image of the main subject 80 is output from the brightness monitor 73, so that the determined integration time is not the one for sufficiently obtaining the brightness distribution of the main subject 80.

Accordingly, an object of the present invention is to provide a camera having a distance measuring device according to the external light passive AF method capable of responding to changes in taking magnification and not readily affected by a light source in the background.

SUMMARY OF THE INVENTION

To attain the above-mentioned object, the present invention provides an image taking apparatus comprising: a taking optical system for imaging a subject light; a distance measurement optical system having an optical path different from an optical path of the taking optical system, and not interlocking with a change of a focal length of the taking optical system; a pair of image sensor arrays for receiving subject light imaged by the distance measurement optical system; a plurality of brightness monitors being placed close to one of the image sensor arrays, each independently for measuring a brightness of a subject in a predetermined area and for outputting a signal corresponding to the brightness; a selector for selecting a predetermined brightness monitor from among the brightness monitors based on a image taking condition; and a controller for controlling integration by the image sensor arrays based on the signal from the brightness monitor selected by the selector, wherein one of the brightness monitors has a measurement area being large compared to an other brightness monitor, and covers a measurement area of the other brightness monitor.

According to this structure, since a plurality of brightness monitors having different measurement area is provided, the brightness of the subject can be measured in different area. Therefore, for example, when the taking area is decreased because of a change of the focal length of the taking optical system, by using a brightness monitor having a small measurement area, measurement is never affected by the brightness of a subject other than the main subject. Consequently, the typical brightness based on the brightness of the main subject can precisely be measured. Moreover, since the brightness monitors each independently measure the brightness of the subject and one of the brightness monitors is selected, the control of the integration time is short compared to a case where each brightness monitor outputs a brightness signal and processing is performed one after another.

In the following description, like parts are designated by like reference numbers throughout the several drawings.

BRIEF DESCRIPTION OF THE DRAWINGS

FIGS. 2(a1), 2(a2), 2(a3), 2(b1), 2(b2) and 2(b3) are views of assistance in explaining the positional relationship between the taking area, and image sensor arrays and brightness monitors when the distance measuring device of FIG. 1 is pointed at a subject, FIGS. 2(a1) to 2(a3) showing a case where the focal length is short, FIGS. 2(b1) to 2(b3) showing a case where the focal length is long;

DETAILED DESCRIPTION OF THE PREFERRED EMBODIMENT

Hereinafter, cameras according to embodiments of the present invention will be described with reference to the drawings.

Figure 2:
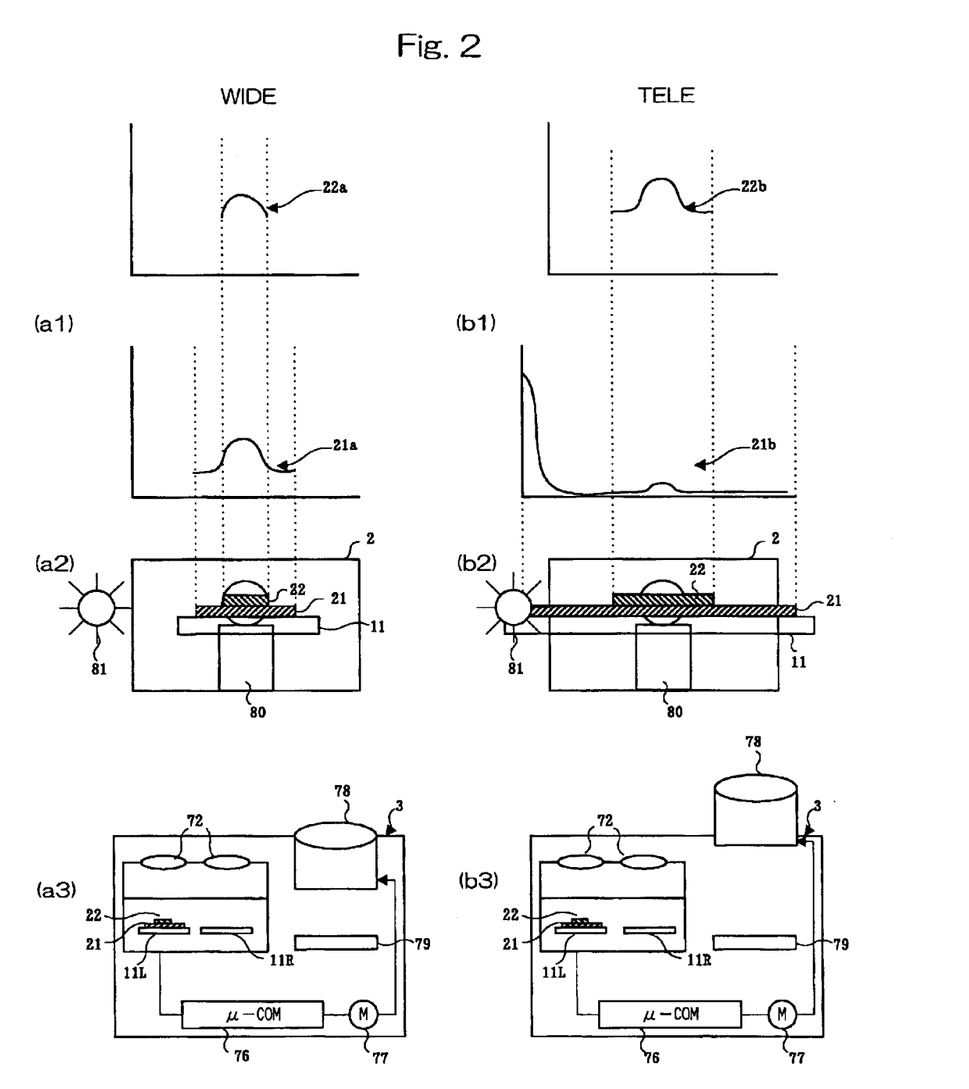

FIG. 2(a3) is a block diagram showing the structure of a camera according to a first embodiment of the present invention. The camera 3 according to the present embodiment has a distance measuring device according to the external light passive AF method in which a taking optical system 78 and a distance measurement optical system 72 of the distance measuring device are separately provided. The taking optical system 78 is capable of changing its focal length by the zoom lens system being driven by a motor 77 under the control of a microcomputer 76, whereas the distance measurement optical system 72 of the distance measuring device is not designed so as to change its focal length by being driven by the motor 77. That is, the focal length of the distance measurement optical system 72 is not interlocked with the focal length of the taking optical system 78.

Figure 1:
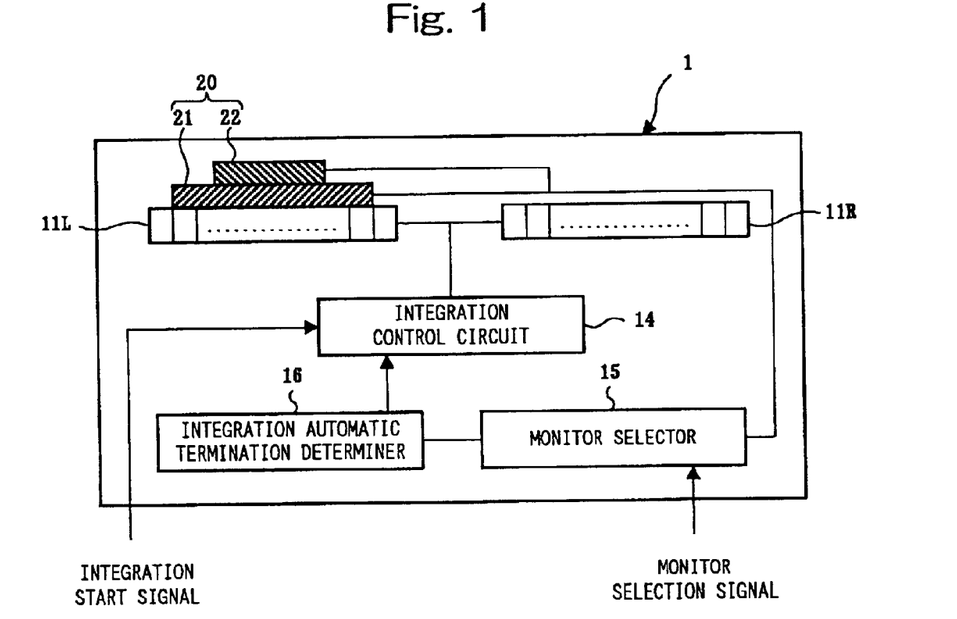
FIG. 1 is a block diagram showing the structure of a relevant part of a distance measuring device provided in a camera according to a first embodiment of the present invention.

FIG. 1 is a block diagram showing the structure of a relevant part of the distance measuring device used for the camera of FIG. 2(a3). The distance measuring device 1 comprises: a pair of left and right image sensor arrays 11L and 11R; two brightness monitors 20 (21, 22) placed so as to adjoin the top of the left image sensor array 11L; an integration control circuit 14 controlling the integration time of the image sensor arrays 11L and 11R; a monitor selector 15 determining which monitor to select based on electric signals output from the two brightness monitors 21 and 22; and an integration automatic termination determiner 16 determining the timing of termination of the integration time of the image sensor arrays 11L and 11R.

The image sensor arrays 11L and 11R each comprise an image sensor including a plurality of linearly arranged pixels, and convert light information into electric signals by receiving light from the subject and accumulating charges. By providing a pair of left and right image sensor arrays, distance measurement is performed by calculating the difference between the subject images obtained by the left and the right elements. To obtain a subject image in a suitable contrast by the image sensor arrays 11, it is necessary that a suitable integration time be determined. Therefore, the integration time is calculated by the integration automatic termination determiner 16 based on the typical brightness measured by the brightness monitors 20, and the integration control circuit 15 controls the integration time of the image sensor arrays 11.

The brightness monitors 20 are structured so that their widths vary in the direction of the base line of the image sensor arrays 11 and that their measurement areas viewed from a direction vertical to the direction of the base line overlap each other. The two brightness monitors 21 and 22 each independently measure the brightness of the subject light incident on the monitor and output an electric signal representative of the brightness of the subject.

FIGS. 2(a1), 2(a2), 2(a3), 2(b1), 2(b2) and 2(b3) are views of assistance in explaining the positional relationship between the taking area, and the image sensor arrays 11 and the brightness monitors 20 when the camera is pointed at a subject. FIGS. 2(a1) to 2(a3) show a case where the focal length is short. FIGS. 2(b1) to 2(b3) show a case where the focal length is long. It is assumed that the subject comprises a main subject 80 being a person and the background including a light source 81 such as the sun situated in the vicinity of the main subject.

In the case where the focal length is short, when the main subject 80 is situated within the taking area 2 of the taking optical system 78 and the light source 81 is situated outside the taking area 2 as shown in FIG. 2(a2), the image sensor arrays 11 are situated so as to measure a substantially central part of the taking area. The two brightness monitors 21 and 22 are situated so as to measure the brightness of the main subject 80. As shown in FIG. 2(a1), in the brightness signals (21a, 22a) from the brightness monitors 21 and 22, the brightness of the part corresponding to the main subject 80 is high and the brightness of the background is low, so that an appropriate typical brightness value of the main subject 80 can be calculated.

On the other hand, as shown in FIG. 2(b2), when the focal length is long, since the measurement area of the optical system 72 of the distance measuring device is not interlocked with the taking area 2 of the taking optical system 78, there are cases where parts of the image sensor arrays 11 and a brightness monitor extend off the taking area 2 of the taking optical system 78. In such cases, as shown in FIG. 2(b2), the brightness monitor 21 having a large measurement area is situated so that parts thereof extend off the taking area 2 of the taking optical system 78, and measures the brightness of the light source 81 situated outside the taking area 2. Consequently, as shown in FIG. 2(b1), in an brightness signal 21b output from the brightness monitor 21, the brightness of the measured part of the light source 81 is high and on the contrary, the brightness of the main subject 80 is low, so that an appropriate typical brightness of the main subject 80 cannot be measured.

On the contrary, the brightness monitor 22 having a small measurement area is situated within the taking area even when the taking area is decreased by an increase in the focal length of the taking optical system 78, and measures the brightness of the main subject 80. Consequently, in an brightness signal 22b output from the brightness monitor 22, the brightness of the part corresponding to the main subject 80 is high and the brightness of the background is low, so that measurement is appropriately performed.

Therefore, an appropriate brightness monitor is selected from among the brightness monitors each having independently measured the brightness of the measurement area and output a brightness signal as described above, and the integration time is determined based on the output signal of the selected brightness monitor.

The selection of the brightness monitor is made by the monitor selector 15 based on the focal length of the taking optical system 78 calculated by the microcomputer 76. That is, in the case of FIGS. 2(a1) to 2(a3) where the focal length is short, the brightness monitor 21 having a large measurement area is selected, and in the case of FIGS. 2(b1) to 2(b3) where the focal length is long, the brightness monitor 22 having a small measurement area is selected. The monitor selector 15 receives information on the focal length from the microcomputer 76, and outputs the output of the selected brightness monitor to the integration automatic termination determiner 16.

As described above, according to the distance measuring device of the present embodiment, when measurement is apt to be affected by the brightness of the background because of a change in the focal length (change in the taking magnification) of the taking optical system or the like, by using the brightness monitor 22, the contrast (brightness distribution) of the subject can be obtained with no influence by the light source 81 in the background.

Figure 3:
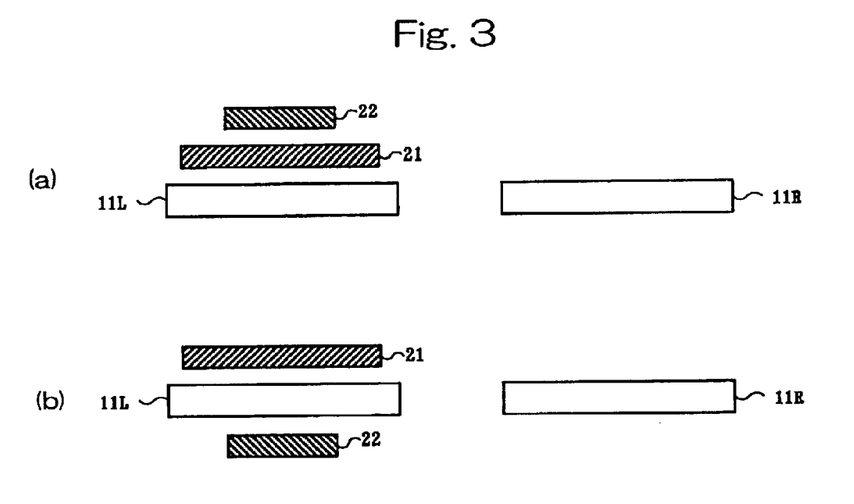
FIGS. 3(a) and 3(b) show modifications of the distance measuring device of FIG. 1.

While in the distance measuring device of the present embodiment, the brightness monitors 21 and 22 are placed so as to adjoin the left image sensor array 11L, they may be placed with a slight space in between as shown in FIG. 3(a). Moreover, as shown in FIG. 3(b), the brightness monitors 21 and 22 may be placed above and below the image sensor array 11L so as to sandwich the image sensor array 11L with a predetermined distance in between.

Figure 4:
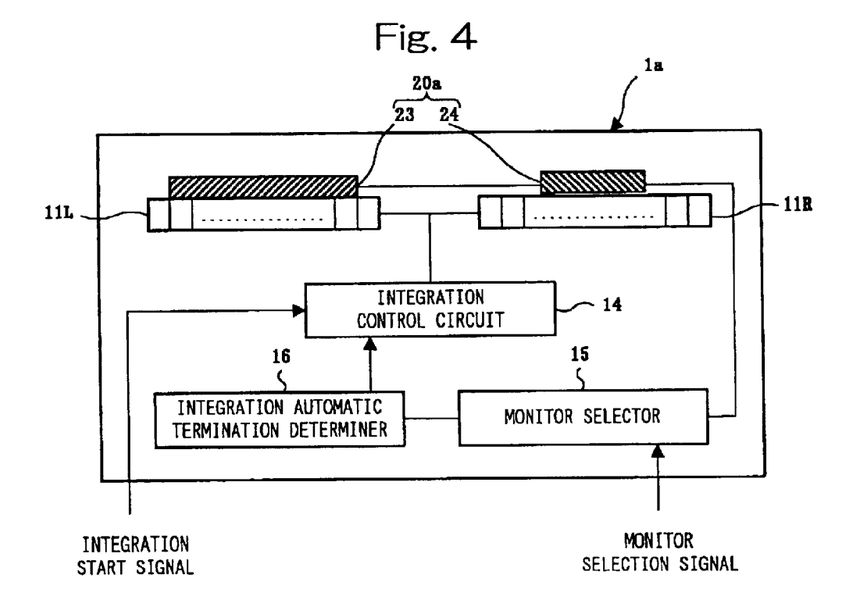
FIG. 4 is a block diagram showing the structure of a relevant part of a distance measuring device provided in a camera according to a second embodiment of the present invention.

FIG. 4 is a block diagram showing the structure of a relevant part of a distance measuring device used for a camera according to a second embodiment of the present invention. This camera has a similar structure to the camera according to the first embodiment except the structure of the distance measuring device described below, and the focal length of the distance measurement optical system is not interlocked with the focal length of the taking optical system.

The distance measuring device 1a comprises: a pair of left and right image sensor arrays 11L and 11R; two brightness monitors 20a (23, 24) placed on the tops of the image sensor arrays 11L and 11R, respectively; an integration control circuit 14 controlling the integration time of the image sensor arrays 11L and 11R; a monitor selector 15 making brightness monitor selection; and an integration automatic termination determiner 16 determining the timing of termination of the integration time of the image sensor arrays 11L and 11R. These blocks perform the same operations as those of the distance measuring device 1 according to the first embodiment.

The distance measuring device 1a according to the present embodiment is characterized in that one brightness monitor (23 or 24) is disposed on each of the left and the right image sensor arrays and the brightness monitors 23 and 24 are different in measurement width. By arranging the brightness monitors in this manner, a brightness monitor placed so as to be separate from the image sensor arrays 11 like the brightness monitor 22 in the first embodiment is made absent, so that the brightness value of an area closer to the subject can be measured.

Figure 5:
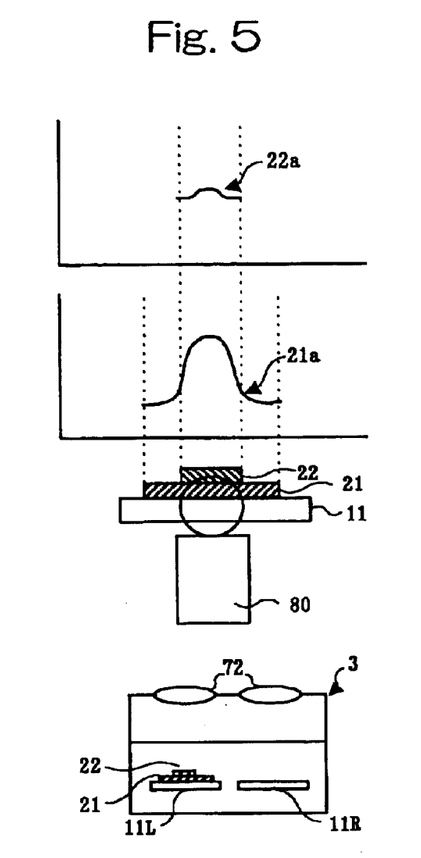
FIG. 5 is a view of assistance in explaining the positional relationship between the taking area, and image sensor arrays and brightness monitors when a distance measuring device is pointed at a subject.

That is, when the two brightness monitors 21 and 22 are placed one on the other on one of the image sensor arrays 11 as shown in FIG. 5, the brightness monitor 22 placed so as to be separate from the image sensor array 11 is present. Although the brightness monitor 21 placed close to the image sensor array 11 can appropriately measure the brightness of the subject, since the brightness monitor 22 measures the brightness of the upper end of the subject 80, there are cases where the brightness of the subject cannot appropriately be measured.

In such cases, while in the brightness signal 21a output from the brightness monitor 21, the brightness of the part corresponding to the subject 80 is high, in the brightness signal 22a output from the brightness monitor 22, the brightness of the subject cannot sometimes be measured. Consequently, there are cases where correlation with the image sensor arrays 11 trying to perform image taking with the subject 80 as the main subject cannot be obtained.

Figure 6:
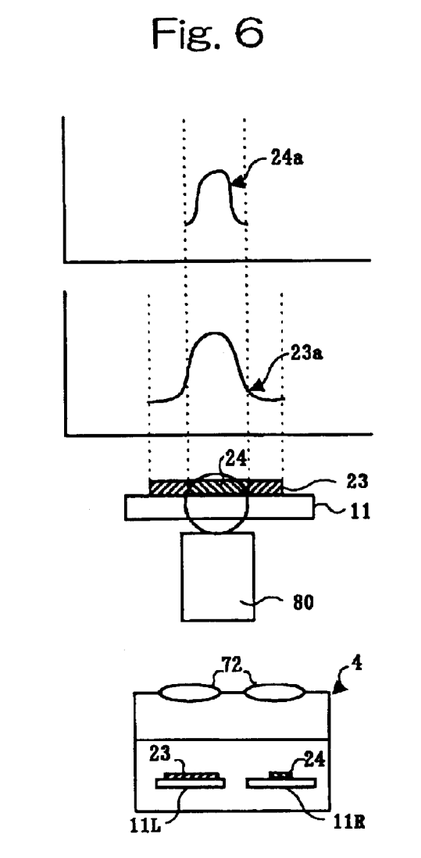
FIG. 6 is a view of assistance in explaining the positional relationship between the taking area, and image sensor arrays and brightness monitors when the distance measuring device of FIG. 4 is pointed at a subject.

On the contrary, according to the structure of the present embodiment, since the two brightness monitors are separately placed on the left and the right image sensor arrays 11 as shown in FIG. 6, the two monitors are placed so as to overlap each other with respect to the subject of the taking optical system. Consequently, the brightness of the subject at a position adjacent to the image sensor arrays can be measured, and the output signals thereof are appropriate ones like signals 23a and 24a in which the brightness of the part of the subject is high.

Figure 8:
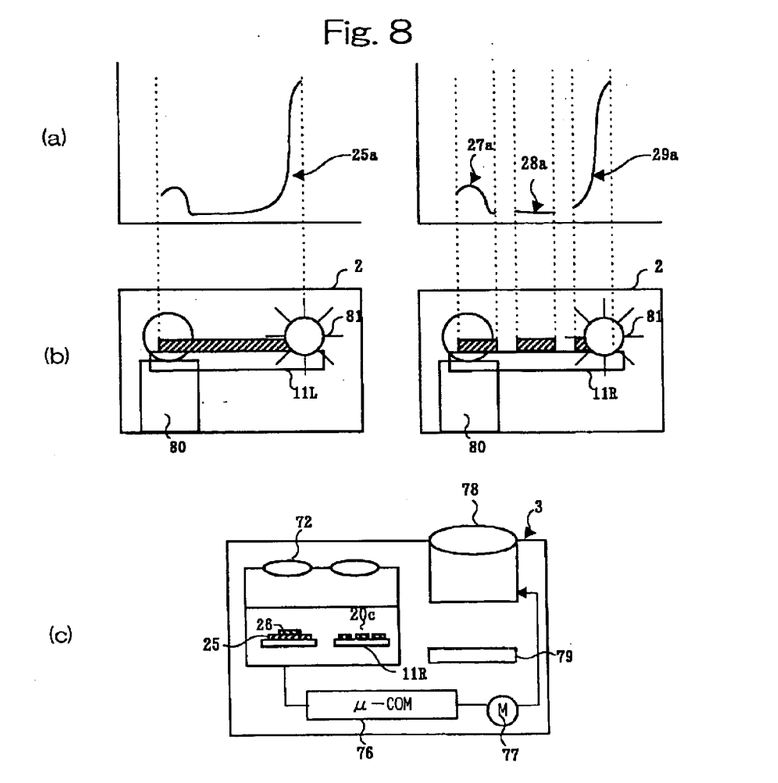
FIGS. 8(a) to 8(c) are views of assistance in explaining the positional relationship between the taking area, and image sensor arrays and brightness monitors when the distance measuring device of FIG. 7 is pointed at a subject.

FIG. 8(c) is a block diagram showing the structure of a camera according to a third embodiment of the present invention. This camera has a similar structure to the camera according to the first embodiment except the structure of a distance measuring device described below, and the focal length of the distance measurement optical system is not interlocked with the focal length of the taking optical system.

Figure 7:
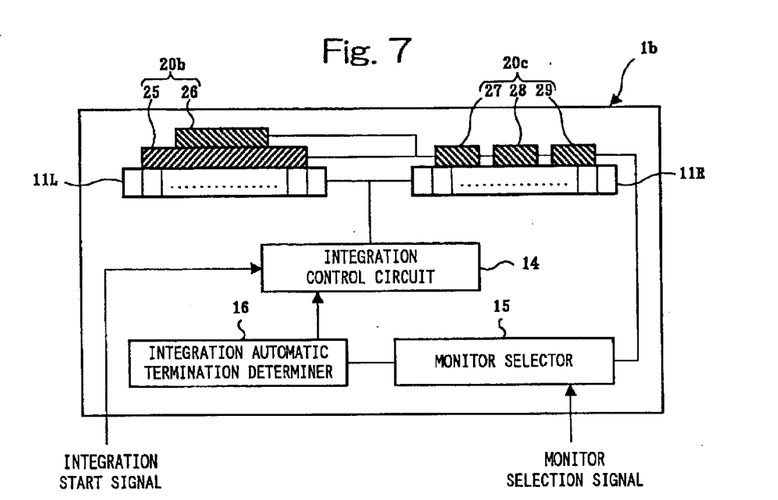
FIG. 7 is a block diagram showing the structure of a relevant part of a distance measuring device provided in a camera according to a third embodiment of the present invention.

FIG. 7 is a block diagram showing the structure of a relevant part of the distance measuring device in the camera shown in FIG. 8(c). The distance measuring device 1b comprises: a pair of left and right image sensor arrays 11L and 11R; two brightness monitors 20b (25, 26) placed one on the other on the top of the left image sensor array 11L; three brightness monitors 20c (27, 28, 29) placed side by side on the right image sensor array 11R; an integration control circuit 14 controlling the integration time of the image sensor arrays 11L and 11R; a monitor selector 15 making brightness monitor selection; and an integration automatic termination determiner 16 determining the timing of termination of the integration time of the image sensor arrays 11L and 11R. These blocks perform the same functions as those of the distance measuring device 1 according to the first embodiment.

The brightness monitors 25 to 29 each independently measure the brightness of the part of the subject situated on the monitor, and output a brightness signal representative of the typical brightness. When the light source 81 is included in the taking area of the taking optical system as shown in FIG. 8(b), in the brightness signal of the brightness monitor 25 situated on the left side, the brightness of the part of the light source is high as shown at 25a in FIG. 8(a). On the other hand, the three brightness monitors on the right side each measure a small area, and the output signals thereof each have a brightness distribution corresponding to the part of the subject situated on the brightness monitor as shown at 27a to 29a in FIG. 8(a).

When the two brightness monitors on the left side are selected, the monitor selector 15 making brightness monitor selection makes the selection according to the focal length of the taking optical system as described above. In this example, description will be given on the assumption that the brightness monitor 25 is selected. When the brightness value of the brightness monitor 25 having a large measurement area is outside a predetermined range, the monitor selector 15 selects the brightness signal of the brightness monitor 27, 28 or 29 on the right side having a small measurement area. That is, in the brightness signal of the brightness monitor 25, while the brightness of the right end is high because of the light source 81, the brightness of the main subject 80 is low and the typical brightness is high as a whole. Therefore, the monitor selector 15 further selects an appropriate brightness monitor from among the brightness monitors 27 to 29 on the right side.

Specifically, the output signal of the brightness monitor 25 on the left side is compared with the output signals of the brightness monitors 27 to 29 placed side by side on the right side. In the output signal of the brightness monitor 25 on the left side, a high-brightness part is present only on the right side, whereas in the three outputs 27a to 29a of the brightness monitors 20c on the right side, the output waveform of the brightness monitor 27 on the leftmost side is different from the output of the brightness monitor 25 on the left side. Therefore, determining that the main subject 80 is preset in this part, the brightness monitor 27 is selected.

At this time, the monitor selector 15 may compare image data generated through the taking optical system with the output signals of the brightness monitors to thereby make brightness monitor selection. Specifically, when an area determined to be the main subject is included in the image data, a brightness monitor on the right side is selected that is closest to the position, in the horizontal direction, of the area.

Figure 9:
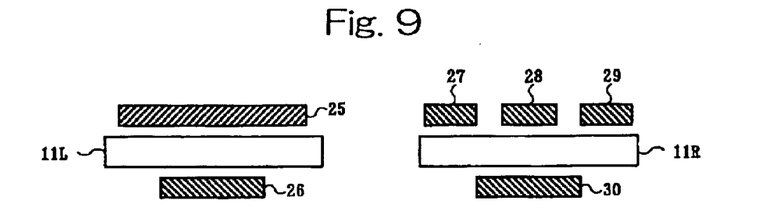
FIG. 9 shows a modification of the distance measuring device of FIG. 7.

As a modification of the distance measuring device, brightness monitors may be placed as shown in FIG. 9. That is, brightness monitors (25, 26) having a large and a small measurement area are placed above and below the left image sensor array 11L, three brightness monitors 27, 28 and 29 are placed side by side above the right image sensor array 11R, and a brightness monitor 30 having a large measurement area is placed below the right image sensor array 11R. By doing this, the number of selectable brightness monitors can be increased.

Figure 10:
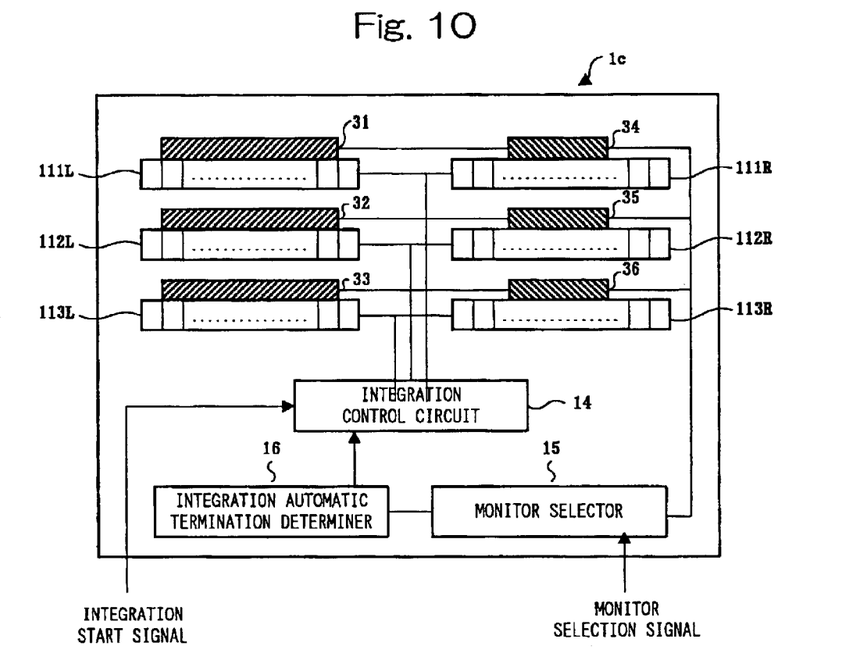
FIG. 10 is a block diagram showing the structure of a relevant part of a distance measuring device provided in a camera according to a fourth embodiment of the present invention.

FIG. 10 is a block diagram showing the structure of a relevant part of a distance measuring device used for a camera according to a fourth embodiment of the present invention. This camera has a similar structure to the camera according to the first embodiment except the structure of a distance measuring device described below, and the focal length of the distance measurement optical system is not interlocked with the focal length of the taking optical system.

The distance measuring device 1c comprises: three pairs of left and right image sensor arrays 111L to 113L, 111R to 113R); brightness monitors 31, 32 and 33 having a large measurement area placed on the top of the left image sensor arrays 111L to 113L; three brightness monitors 34, 35 and 36 placed on the top of the right image sensor arrays; an integration control circuit 14 controlling the integration time of the image sensor arrays (111L to 113L, 111R to 113R); a monitor selector 15 making brightness monitor selection; and an integration automatic termination determiner 16 determining the timing of termination of the integration time of the image sensor arrays (111L to 113L, 111R to 113R). These blocks perform substantially the same functions as those of the distance measuring device 1 according to the first embodiment.

When distance measurement and focus detection are performed, one of the three pairs of image sensor arrays (111L to 1113L, 111R to 113R) placed side by side in the vertical direction is selected under the control of the microcomputer.

The brightness monitors 31 to 36 each independently output a signal representative of the brightness of the subject. Brightness monitor selection is made by the monitor selector 15 as described above. Selection of left and right brightness monitors with respect to the size of the measurement area may be made according to the focal length like in the distance measuring device 1 according to the first embodiment. Moreover, selection of brightness monitors placed in the vertical direction may be made, for example, according to whether the brightness from each brightness monitor is within a predetermined range or not.

For example, when a high-brightness light source such as the sun is situated on the uppermost image sensor array 111L, the integration time of the uppermost image sensor array 111L is controlled by using monitors not overlapping with the light source, for example, the lowermost brightness monitors 33 and 36, whereby the brightness of the subject can be measured with no influence by the sun.

Figure 11:
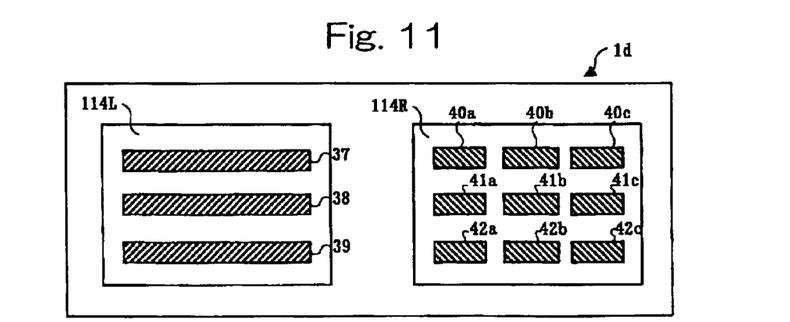
FIG. 11 shows a modification of the distance measuring device of FIG. 10.

FIG. 11 shows the positional relationship between image sensors and brightness monitors in a distance measuring device of a modification of the distance measuring device of FIG. 10. The distance measuring device 1d of FIG. 11 is provided with a plurality of pairs of left and right image sensors 114L and 114R two-dimensionally measuring the subject image. Brightness monitors 37 to 39 having a large measurement area are placed side by side in the vertical direction on the top of the image sensor 114L. Brightness monitors 40a to 42c having a small measurement area are placed in a latticed form on the top of the image sensor array 114R. The brightness monitors each independently monitor the brightness of the subject, and the brightness monitor determining the integration time of the image sensors is selected by the monitor selector.

According to the distance measuring device of the modification, by using the brightness monitor disposed for each of the two-dimensional image sensors, integration control is enabled without impairment of the function of high-density brightness distribution measurement which is a characteristic of two-dimensional image sensors.

As described above, by providing a plurality of brightness monitors having different measurement areas so that one brightness monitor is selectable from there among, the distance measuring device can respond to changes in the taking magnification of the camera provided with the distance measuring device. Further, flexible processing can be performed, for example, when information on the brightness distributions of dark parts and bright parts of the subject is preponderantly obtained to perform distance measurement.

The present invention is not limited to the above-described embodiments, but may be embodied in various forms. For example, while cameras having a zoom lens system in which the focal length of the taking lens system changes are described as a case where the taking area of the taking optical system changes, the present invention is also applicable to electronic zooming (pseudo zooming).

Although the present invention has been fully described by way of examples with reference to the accompanying drawings, it is to be noted that various change and modifications will be apparent to those skilled in the art. Therefore, unless otherwise such changes and modifications depart from the scope of the present invention, they should be construed as being including therein.

What is claimed is:

1. An image taking apparatus comprising:
   a taking optical system for imaging a subject light;
   a distance measurement optical system having an optical path different from an optical path of the taking optical system, and not interlocking with a change of a focal length of the taking optical system;
   a pair of image sensor arrays for receiving subject light imaged by the distance measurement optical system;
   a plurality of brightness monitors being placed close to one of the image sensor arrays, each independently for measuring a brightness of a subject in a predetermined area and for outputting a signal corresponding to the brightness;
   a selector for selecting a predetermined brightness monitor from among the brightness monitors based on a image taking condition; and
   a controller for controlling integration by the image sensor arrays based on the signal from the brightness monitor selected by the selector,
   wherein one of the brightness monitors has a measurement area being large compared to an other brightness monitor, and covers a measurement area of the other brightness monitor.

2. The image taking apparatus according to claim 1, wherein the measurement area of the brightness monitors having a large measurement area is large in a direction of a base line of the image sensor arrays compared to the other brightness monitor.

3. The image taking apparatus according to claim 1, wherein said image taking condition is at least one of a focal length of the taking optical system, a position of a main subject and a brightness of the main subject.

4. The image taking apparatus according to claim 1, wherein said selector selects the signal from a brightness monitor having a small measurement area when the output from a brightness monitor having a large measurement area is not less than a predetermined value.

5. The image taking apparatus according to claim 1, wherein the one of the image sensor arrays is placed between the brightness monitors.

6. An image taking apparatus comprising:
   a taking optical system for imaging a subject light;
   a distance measurement optical system having an optical path different from an optical path of the taking optical system, and not interlocking with a change of a focal length of the taking optical system;
   a pair of image sensor arrays for receiving subject light imaged by the distance measurement optical system;
   a plurality of brightness monitors being placed close to each of the image sensor arrays, each independently for measuring a brightness of a subject in a predetermined area and for outputting a signal corresponding to the brightness;
   a selector for selecting a predetermined brightness monitor from among the brightness monitors based on a image taking condition; and
   a controller for controlling integration by the image sensor arrays based on the signal from the brightness monitor selected by the selector,
   wherein at least one of the brightness monitors has a measurement area being large compared to an other brightness monitor, and covers a measurement area of the other brightness monitor.

7. The image taking apparatus according to claim 6, wherein the measurement area of the brightness monitors having a large measurement area is large in a direction of a base line of the image sensor arrays compared to the other brightness monitor.

8. The image taking apparatus according to claim 6, wherein said image taking condition is at least one of a focal length of the taking optical system, a position of a main subject and a brightness of the main subject.

9. The image taking apparatus according to claim 6, wherein said selector selects the signal from a brightness monitor having a small measurement area when the output from a brightness monitor having a large measurement area is not less than a predetermined value.

10. The image taking apparatus according to claim 6, wherein at least one of the image sensor arrays is placed between the brightness monitors.

11. The image taking apparatus according to claim 6, further comprises a plurality of pairs of the image sensor arrays and the plurality of brightness monitors being placed close to each pair of the image sensor arrays.

12. The image taking apparatus according to claim 6, further comprises a plurality of brightness monitors have a small measurement area.

* * * * *